Dec. 5, 1967     A. F. FEYLING     3,356,787

ELECTRICAL INSTRUMENT CABLE-SUPPORTED APPARATUS

Filed June 28, 1966

A. FRED FEYLING
INVENTOR.

BY *Ries and Ries*
*Attorneys*

3,356,787
ELECTRICAL INSTRUMENT CABLE-SUPPORTED APPARATUS

Anders F. Feyling, Cambridge, Mass., assignor to Geodyne Corporation, Waltham, Mass., a corporation of Massachusetts
Filed June 28, 1966, Ser. No. 561,104
6 Claims. (Cl. 174—70)

The present invention relates to electrical instrument cable-supported apparatus, being more particularly directed to instrument or sensor housing packages and the like for use with a supporting cable for such purposes as making oceanographic, meteorological or geological measurements or the like, wherein the cable comprises conductive lines adapted for supporting and establishing electrical connections with one or more of such instrument or sensor packages spaced therealong.

Instrument packages of this type have been commonly constructed with the cable terminating in a strain relief and electrical connector at each end of the instrument, in which case the entire strain of the cable is transmitted directly across the instrument package. This has necessitated a heavy design to stand up under the strains imposed by the cable. Other resulting disadvantages reside in the fact that when the system is to be installed, a pre-assembled instrument package will not pass over or around a reel, drum or pulley. It is to the obviating of these problems that the present invention is accordingly primarily directed.

An object of the invention is thus to provide a new and improved apparatus of the above-described character which is simple, light and inexpensive in construction and is convenient to pre-assemble in the field, being readily adapted to pass over or around a reel, drum or pulley during installation.

A further object is to provide a novel instrument housing package that does not require the cable strain to be transmitted across the instrument package.

Other and further objectives and advantages of the invention will be pointed out in the following more detailed description and particularly delineated in the appended claims; the invention now being described with reference to the accompanying drawings, wherein:

Figure 1:
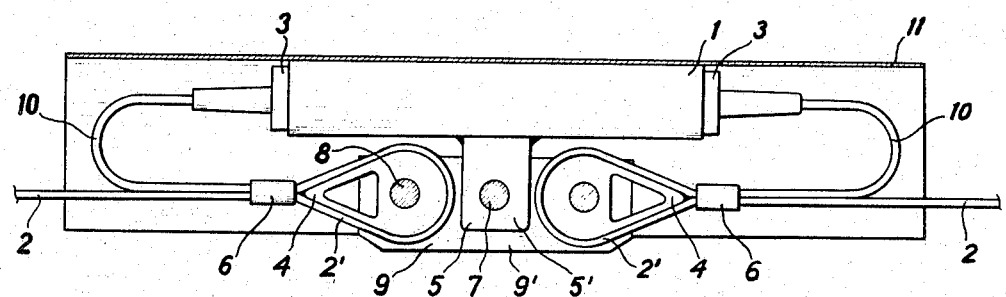
FIG. 1 is a side elevational view of the instrument housing package with its connecting cable under tension.

In FIG. 1, a preferred electrical instrument cable-supported apparatus is illustrated embodying a preferably, though not essentially, cylindrical housing package 1 interiorly containing an electrical instrument or sensor or the like (not shown) to which electrical connections are established through a pair of electrical connectors 3, shown sealing off oppositely disposed ends of the housing to render the housing water-tight or otherwise sealed to the environment in which the apparatus is to be employed. The housing package 1 is provided with a depending flange 5 apertured at 5' to receive a securing pin 7, detachably inserted at an intermediate location between a pair of substantially parallel mounting bracket plates 9.

Figure 2:
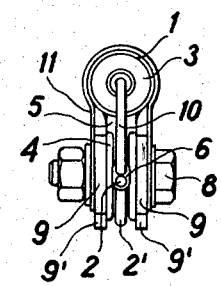
FIG. 2 is an end elevation.
Figure 3:
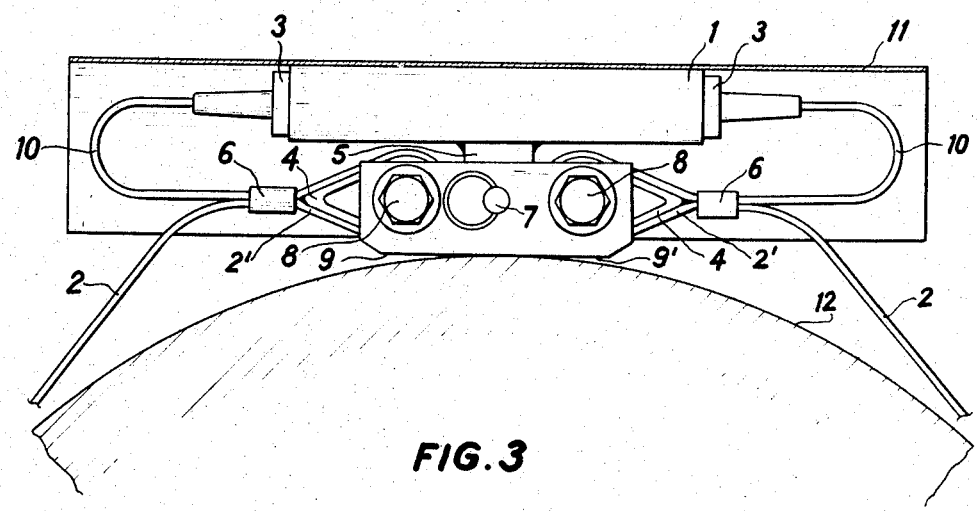
FIG. 3 is a view similar to FIG. 1 illustrating the instrument package housing moving over a reel, drum or pulley.

The supporting cable, two adjacent sections 2 of which only are illustrated in FIGS. 1 and 3, preferably comprises conductive lines for establishing electrical connection to and from the electrical instrument sensor or the like within the housing package 1, as for the purpose of completing an electrical path communicating with the surface of the ocean, in the case of underwater use of the cable 2 to suspend one or more measuring instruments at different depths. Such suspension is illustrated in FIG. 1, though the drawing is schematically shown horizontal instead of vertical, as in underwater operation. At the adjacent terminal portions of cable sections 2, the cable is wound at 2' about eyelets 4, preferably having a converging neck to enable the cable to be tightly clamped at the region 6, FIGS. 1, 2 and 3, where it loops back upon itself. The eyelets 4 are attached to opposite ends of the bracket 9—9 by removable pins 8, such as bolts.

The conductive cable (or other electrical conductor) further extends from the clamps 6 in substantially fixed loops 10 to the connectors 3 of the instrument housing package 1, such that the tension or strain in the cable between sections 2 is developed solely between the points of connection 8—8 to the bracket 9—9, with no strain applied to the loops 10—10 and thus across the instrument package. Thus the heavy connectors and other constructions and the strain relief devices of the prior art are automatically obviated; and, indeed, the package 1 may be pre-assembled and readily wound about a drum 12 or the like, FIG. 3, riding upon a flat portion of the lower outer bearing surfaces 9' of the bracket plates 9, displaced below the terminal portion connections at 8—8, with the cable deflection and strain effected at the bracket and without tensioning or otherwise deforming the electrical connection loops 10 to the housing connectors 3.

It is evident from the above that the electrical connections and instrument packages can be readily removed at 7 for inspection, testing or replacement without disrupting or relieving the strain imposed on the cable 2—2, and that the cable tension will not disrupt the instrument package environmental seals at 3 when used in a situation such as an oceanographic or underwater measuring system. In view of this novel construction, moreover, the housing package may be made as small and compact as desired to provide minimum weight and drag and, indeed, may be assembled with any number of commercially available cables without special design considerations.

The novel construction of the invention also readily adapts itself, without disrupting the operational features above-described, to the use of a fish-bite or shock-damage protective shield 11, substantially U-shaped in cross-section and provided about the housing 1 with the bracket bearing surfaces 9' depending through the bottom opening and the sides of the shield secured by the bolts 8 to the outer surfaces of the bracket plates 9, FIG. 2.

Further modifications will also occur to those skilled in this art, and all such are considered to fall within the spirit and scope of the invention as defined in the appended claims.

What is claimed is:

1. An electrical instrument cable-supported apparatus having, in combination, a substantially cylindrical instrument housing package provided with electrical connector means communicating with the interoior of the housing, said electrical connector means comprising a pair of electrical connectors at oppositely disposed ends of the housing, a mounting bracket to which the housing is secured and to opposite ends of which terminal portions of sections of a cable are mechanically connected, the said bracket having an exposed outer bearing surface displaced from the said terminal portions, electrical conductor means comprising a pair of substantially fixed loops connected between said electrical connectors and said terminal cable portions, respectively, said cable being conductive such that electrical connection is effected from one cable section through its terminal portion and the electrical conductor loop connected thereto and its connector to the instrument within the housing, thence from the opposite end connector along its electrical conductor loop to the terminal portion of the other section of the cable, the said bearing surface having a substantially flat portion adapted to bear against a drum about which the cable may be wound with the said cable sections assuming the strain between said terminal cable portions while preventing tension upon the said substantially fixed electrical conductor loops and their connection to the instrument housing, the said bracket comprising a pair of substantially parallel plates having detachable pin means extending therebetween near its ends, the said terminal portions of the cable sections each comprising an eyelet about which the cable is fixedly wound and through which one of the pin means extends.

2. Apparatus as claimed in claim 1 and in which the terminal portion of each of said conductive cable sections wound about the corresponding eyelet extends back upon itself and then forms one of the said electrical conduction loops, clamping means being provided at the region where the cable section extends back upon itself.

3. Apparatus as claimed in claim 1 and in which further detachable pin means is provided between the said bracket plates, and the housing is provided with depending flange means having aperture means receiving said further pin means between said bracket plates, thereby detachably securing the housing to the bracket.

4. Apparatus as claimed in claim 1 and in which shield means, substantially U-shaped in cross-section is provided about the said housing and bracket with the said bracket outer surface depending through the opening in the U, and means mounting the sides of the shield upon said bracket plates.

5. An electrical instrument cable-supported apparatus having, in combination, an instrument housing package provided with electrical connector means communicating with the interior of the housing, a mounting bracket to which the housing is secured and to opposite ends of which terminal portions of sections of a cable are mechanically connected, the bracket having an exposed outer bearing surface displaced from the said terminal portions, electrical conductor means comprising a substantially fixed loop connected between said electrical connector means and at least one of said terminal cable portions, the said outer bearing surface having a substantially flat portion adapted to bear against a drum about which the cable may be wound with the said cable sections assuming the strain between said terminal cable portions while preventing tension upon the said substantially fixed electrical conductor loop and its connection to the instrument housing, the mechanical connection of at least said one terminal cable portion to said bracket comprising eyelet means supported upon said bracket and about which said one cable portion is tightly wound back upon itself and secured to form a loop continuous with the first-mentioned loop.

6. The combination of claim 5, said eyelet means having a tapered neck at which the loop about said eyelet means is held by clamp means.

References Cited

UNITED STATES PATENTS

| 1,743,168 | 1/1930 | Thomason et al. | 174—43 X |
| 2,668,239 | 2/1954 | Jipp | 174—43 X |

FOREIGN PATENTS

| 1,185,393 | 2/1959 | France. |

LARAMIE E. ASKIN, *Primary Examiner.*